2,999,655
POLE TENSIONER
Gerald A. M. Petersen, 460 Kifer Road, Santa Clara, Calif., Robert W. Goode, Morgan Hill, Calif., and Herschel Robert Gustafson, Spokane, Wash.; said Goode and said Gustafson assignors to said Petersen
Filed Feb. 6, 1959, Ser. No. 791,617
13 Claims. (Cl. 242—155)

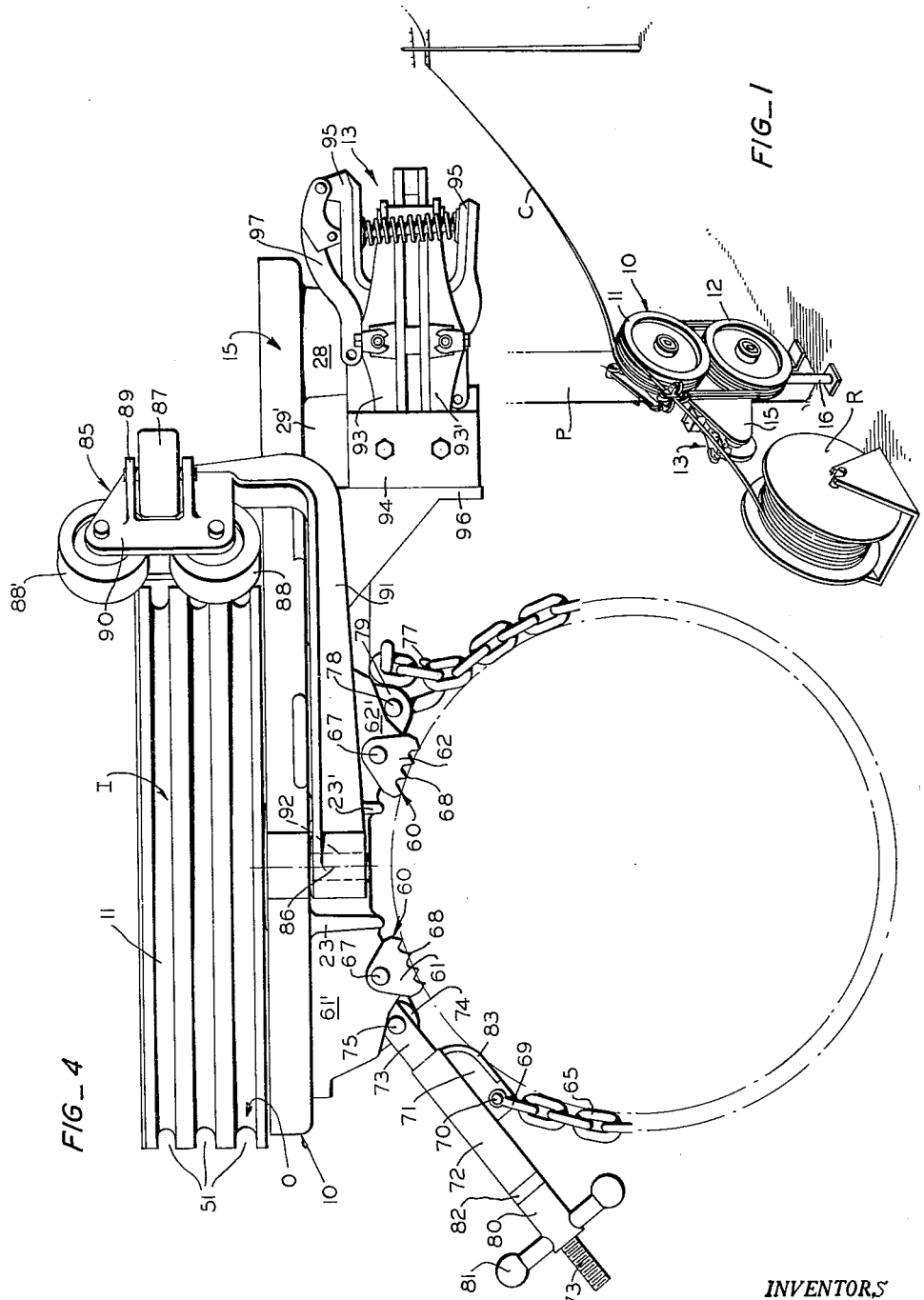

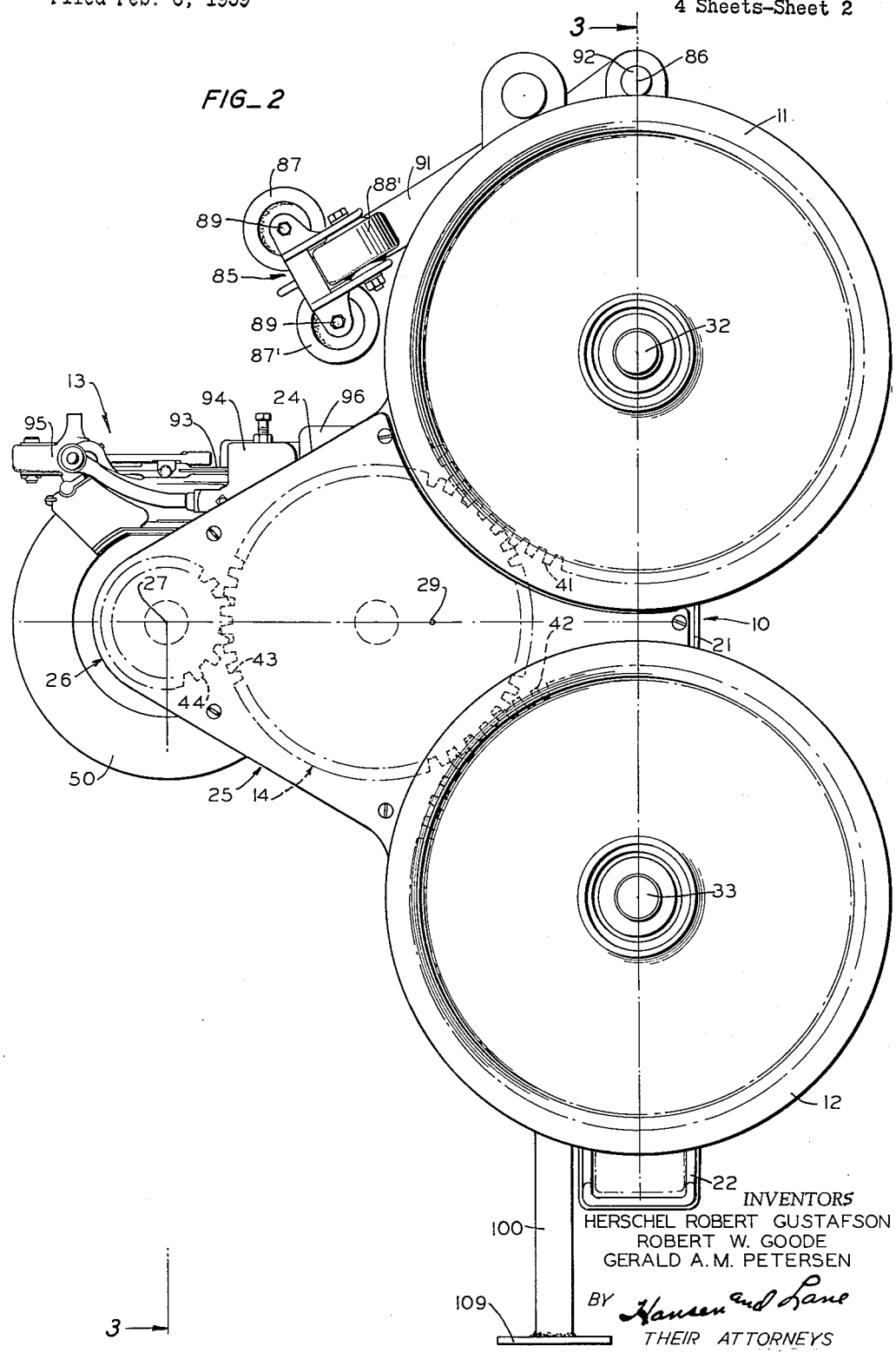

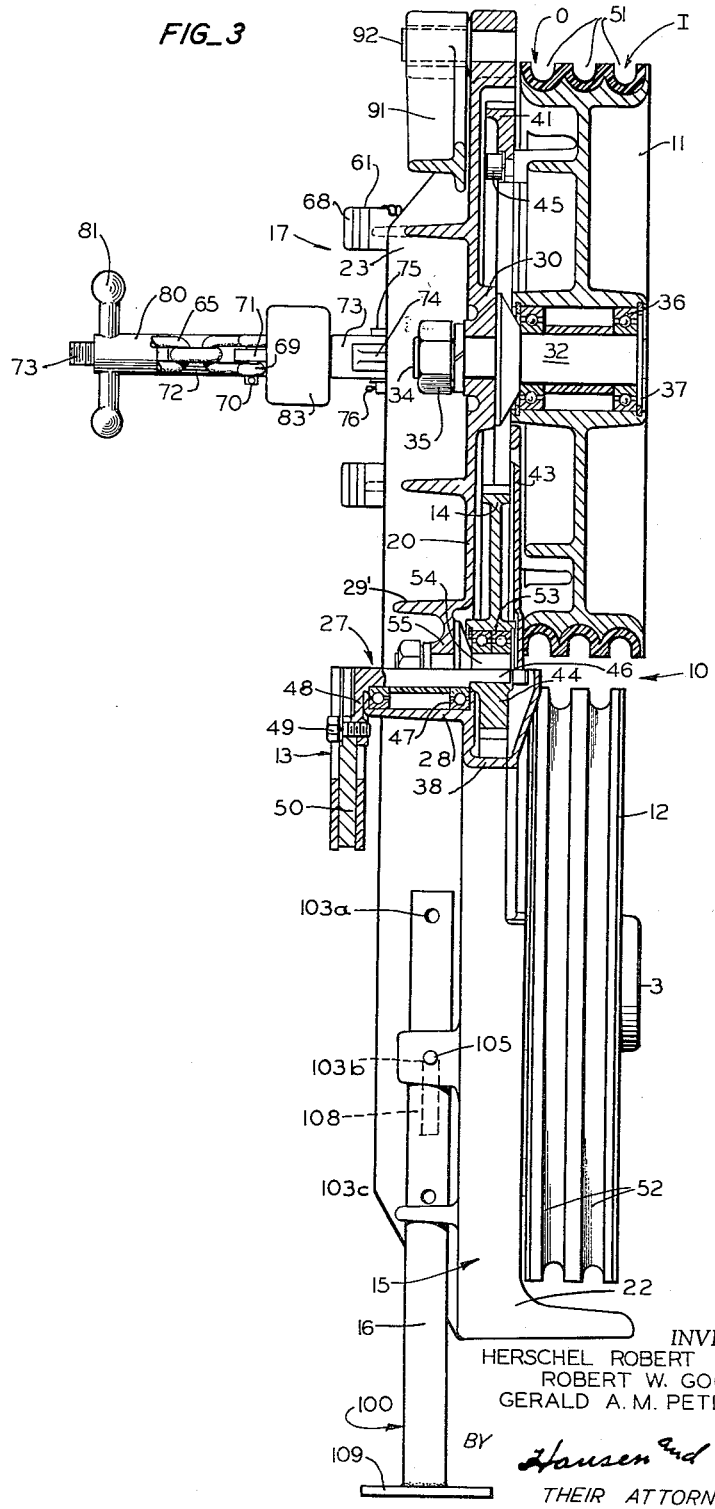

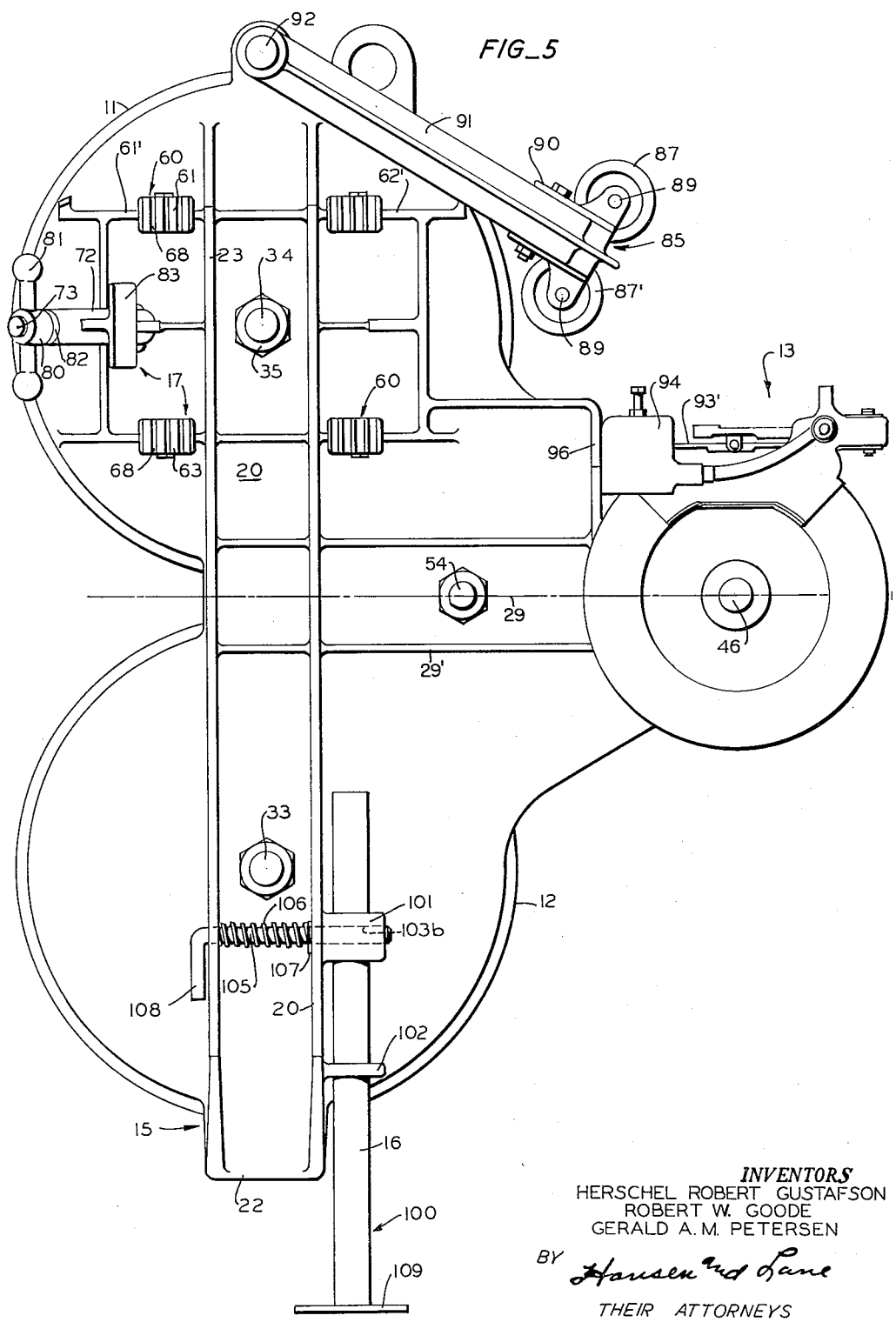

This invention relates to cable or wire stringing and tensioning apparatus and more particularly to a portable type unit of that character hereinafter referred to as a pole tensioner.

So far as the wire stringing and tensioning aspects of the present invention is concerned, the basic principle of operation is well known in the art. Briefly such equipment consists of a set of bull wheels journaled on a frame in spaced relation to each other so that the wire or cable to be strung under tension may be wound about the bull wheels a number of times to afford sufficient traction relative to the grooved peripheries thereof, and a brake means operatively associated with these bull wheels such as to retard rotation thereof to attain control over the speed at which the wire may be pulled around the bull wheels.

Equipment of this general character has heretofore been mounted on mobile units and constructed on a large scale to handle the installation of heavy power transmission wires or cable. The present invention contemplates the provision of a relatively light weight unit for installing distribution lines or cables. It consists of a sturdy bull wheel tensioner which can be carried about other than on a wheeled vehicle and placed for operation with a minimum of effort.

One of the principal objects of this invention is to provide a light weight portable tensioning device adapted to be anchored to a power pole by which the device is firmly held to enable it to effect a tensioning of wire or cable to be strung over a series of such power poles.

Another object is to provide in a portable type wire tensioner a means for securing the same to a power pole in a firm and stable manner. This object further entails the provision of a self aligning fair-lead for incoming cable or wire and one which is readily adaptable to facilitate a reverse operation of the pole type tensioner wherever such reverse adaptation becomes necessary.

It is another object of this invention to provide a pole type tensioner mounted on a single piece frame so constituted as to maintain the torsionable aspects of the tensioner, while in use, as close as possible to the anchorage provided by the means for securing the tensioner to a power pole.

The present invention further includes the provision of a retractable foot or stand for the frame and means for setting the same at desired levels incident to the securing of the tensioner to a power pole.

These and other objects of the present invention will become apparent in the following description in the light of the drawings, in which:

FIG. 1 is a perspective panoramic view showing the portable pole tensioner of the present invention in use.

FIG. 2 is a side elevation of the pole tensioner as seen from the front thereof or as from the side shown in FIG. 1.

FIG. 3 is a section through FIG. 2 taken substantially along line 3—3 thereof.

FIG. 4 is a plan view of the pole tensioner.

FIG. 5 is a side elevation of the pole tensioner as seen from the back side thereof.

Referring to the drawings 10 generally designates a pole tensioner constructed in accordance with the present invention which broadly includes a pair of bull wheels 11 and 12 journaled for rotation one above the other in a common plane and operatively associated with a braking mechanism 13 through the medium of a train of gears 14.

In accordance with the present invention the foregoing arrangement is mounted on a frame 15 disposed in a plane adjacent and parallel to that in which lie the bull wheels, braking mechanism and interconnecting train of gears therefor. In further compliance with the present invention the frame 15 is provided with a stand 16 for supporting the frame and tensioning equipment thereon vertically above pavement or any like surface; and a clamping means 17 for securing the frame 15 in an upright operative position adjacent a power pole or the like.

The frame 15 is in the from of a triangular web 20 having one side 21 thereof disposed to stand vertically (see FIG. 2) and formed integrally with a channel shaped member 22 the flanges 23—23' of which extend laterally therefrom. For purposes of clarity and orientation of parts the frame 15 shall be considered as having a front face and a back face. It is from the back face of frame 15 that the flanges 23—23' extend. The other two sides 24 and 25 of the triangular shaped web 20 diverge into an arcuate terminal end 26 about an axis 27 of a hub or bearing housing 28 which extends rearwardly from the back face of the frame 15. The sides 24 and 25 are substantially identical and constitute the sides of an isosceles triangle of which the side 21 constitutes the base. An imaginary line 29 bisecting the angle between the sides 24 and 25 lies perpendicular to the base side 21 as best seen in FIG. 2. A channel shaped member 29' formed on the back face of the frame 15 extends perpendicularly from the channel 22 along the imaginary line 29 and the flanges of this channel 29' terminate and/or merge into the bearing housing 28, previously mentioned.

Equidistant from this imaginary line 29 (the altitudinal axis of the isosceles triangular web 20) there are formed two bosses 30 which extend from the front face of the frame as best seen in FIG. 3. These bosses 30 which are identical are disposed equidistant from the imaginary line 29 and channel 29', one at each base angle of the triangular web 20. From each of these bosses 30 a shaft 32 and 33 extends outwardly from the front face of the frame 15.

Each shaft 32 and 33 is identical in form and design in that each has a threaded end 34 extending through its respective boss 30 from the front face of the frame and is secured to the latter by a nut and lock washer 35. The shaft 32 which is uppermost on the frame supports the upper bull wheel 11 and the shaft 33 supports the lower bull wheel 12, there being suitable ball bearings 36 interposed between the hub of each bull wheel and the respective shaft upon which it is journaled for rotation. Suitable means for securing each bull wheel to its respective shaft is also provided in the form of a snap ring 37 engaging the hub of the bull wheel and the shaft it is mounted on.

Referring again to FIG. 3 note that the front face of the frame 15 is recessed, i.e., bordered by a marginal flange 38 which extends frontward from the triangular shaped web 20. It is within this recess that the train of gears 14 is confined.

The train of gears 14 comprises one gear 41 and 42 for each bull wheel 11 and 12, respectively; an idler gear 43 and a pinion gear 44. The gears 41 and 42 are considered bull wheel gears in that each is secured by a sufficient number of bolts 45 to the back face of the respective bull wheel by which it is carried so as to rotate therewith. The bull wheel gear 41 is mounted concentric to the upper bull wheel 11 and the bull wheel gear 43 is likewise concentric to the lower bull wheel 12.

The pinion gear 44 is keyed to a pinion shaft 46 disposed on the axis 27 of the hub or bearing housing 28 previously mentioned. The pinion shaft 46 is journaled on a ball bearing unit 47 in the housing 28 and has a flanged end 48 exposed to the back face of the frame 15 sufficiently beyond the back extremities of the channel flanges 23—23' to receive and support a brake disc 50. The brake disc 50 is secured by bolts 49 to the flanged end 48 of the pinion gear 46.

Referring again to FIGS. 2 and 3 note that the idler gear 43 is disposed with its toothed periphery in driving engagement with that of each of the bull wheel gears 41 and 42 as well as the teeth of the pinion gear 44. The idler gear 43 is journaled for free rotation on a ball bearing unit 53 mounted on a stud shaft 54 disposed with its axes traversing the imaginary line 29 between the two bull wheel mounts. The back end of the stud shaft 54 is secured to a boss 55 formed integrally with the web casting 20 and extending backward therefrom between the flanges of the channel 29'.

From the foregoing it will be appreciated that as the upper and lower bull wheels 11 and 12 are turned their gears 41 and 42 respectively turn the idler gear 43 which turns the pinion gear 44, pinion shaft 46 and brake disc 50 in unison therewith. Since the gear rotation steps down from the bull wheel gears to the idler gear which is smaller and thence to the pinion gear which has still lesser teeth it will be appreciated that any friction against the brake disc 50 will serve to withstand considerable loads tending to turn the bull wheels.

As best seen in FIG. 3 the bull wheels have grooved peripheries, the upper bull wheel 11 being provided with three annular grooves 51 and the lower bull wheel 12 with two annular grooves 52 which are offset relative to the grooves 51 in the periphery of the upper bull wheel 11. The arrangement is such that a cable or wire C to be strung, enters the outer or input groove I of the upper bull wheel 11 from above, extends downwardly from and tangentially thereof to the outer groove of the lower bull wheel 12 and around the lower half thereof, thence tangently upward therefrom to the second or middle groove of the upper bull wheel 11 and around the upper half thereof and again tangentially downward therefrom to the inner groove of the lower bull wheel 12 and around the lower half thereof and thence tangentially upward into the inner or output groove "O" of the upper bull wheel for extension therefrom toward the cross arm of an adjacent power pole as illustrated in FIG. 1.

In order for the bull wheels 11 and 12 to function properly in the stringing of the cable or wire C the frame 15 must be anchored securely relative to the tug or pull exerted upon the cable. To this end the clamping means 17 is employed. This clamping means 17 is constructed on the back face of the frame 15 so as to face a power pole, post or any other standard P suitably set in earth or on a firm foundation.

The clamping means 17 is illustrated in FIGS. 3 and 4. In general it comprises a pole engaging pad 60 consisting of a set of four jaws 61, 62, 63 and 64, a flexible gird 65 in the nature of a length of chain adapted to encircle the power pole and screw means 66 operatively associated with the pole girding member 65 and the pole engaging pad 60.

The pole engaging pad 60 is formed as a part of the frame 15 concentric to the axis of the uppermost bull wheel 11 in that each of the jaws 61, 62, 63 and 64 are replaceably connected at quadrantal points about the shaft 32, to web-like flanges 61', 62', 63' and 64', respectively, formed integrally with and on the back face of the frame 15. Each jaw is identical in construction in that it is slotted on one side to slip-fit over the flange to which it is to be attached by a cap screw and lock-nut 67 so as to present its toothed face 68 rearwardly for engagement with the pole P to which the tensioner 10 is to be attached. Each jaw is disposed with its toothed face substantially normal to a radial line extending from the vertical center of the pole P and the four jaws are set quadrantially, two 61 and 62 above and two 63 and 64 below the axis of the upper bull wheel shaft 31 and each right and left upper and lower set of jaws 61—63 and 62—64 respectively equidistant from said axis of the upper bull wheel shaft 31. Thus the four jaws of the pad 60 serve to attain a four point engagement with the pole P.

The pole girding chain 65 has one end link permanently connected to a clevis 69 pivotally secured by a pin 70 to a web flange 71 formed on one side of a tubular sleeve 72. The sleeve forms a part of the screw means 66 in that it is mounted for sliding movement upon and axially of a screw shank 73. This screw shank 73 has one end slotted to fit upon a flat boss 74 formed integrally with the frame 15 and is pivotally connected to this boss by a pin 75 suitably held in place by a washer and cotter key 76. The flat boss 74 is disposed horizontally and the pin 75 vertically so that the screw shank 73 can swing in a horizontal plane.

The chain 65 is also adapted to swing horizontally and to hang freely from the device 69, the opposite or free end of the girding chain 65 being disposed to have one or another of its links engage a hook 77 pivotally connected as at 78 to a flat boss 79 similar to the flat boss 74 but equidistant from and on the opposite side of the axis of the bull wheel 11. The tubular sleeve 72 which slides upon the screw shank 73 is held in place thereon by a threaded hub 80 having a handle 81 for turning the hub 80 relative to the threaded end of the screw shank 73. A washer 82 between the hub 80 and sleeve 72 serves to reduce torque upon the sleeve 72 when the hub 80 is turned to force the sleeve toward the back face of the frame 15. It should here be noted that there is an arcuate skid bar 83 formed on the sleeve 72 ahead of the web flange 71 also formed on the latter. This skid bar 83 presents a vertical face adapted to bear against the power pole P for maintaining the screw shank 73 in spaced relation to the pole to prevetn binding against the same when the handle 81 is turned to advance the sleeve 72 up onto the screw shank. Thus it will be seen that when the free end of the girding chain 65 is connected to the hook 77 and the hub 81 turned down upon the screw shank 73 the sleeve 72 is forced toward the back face of the frame 15 to tighten the chain 65 about the pole P. This draws the four jaws 61, 62, 63 and 64 firmly and uniformly against the pole so that the teeth of the jaws become embedded into the pole to thereby secure the frame 15 in vertical position against the pole.

The foregoing arrangement of the clamping means 17 in connection with the frame 15 is such as to resist the tendency of the frame to shift circumferentially of the pole P occasioned by the pull of the cable or wire C as it is being strung under tension over the adjacent pole or poles as depicted in FIG. 1.

The cable or wire C is usually supplied on a reel R which may be supported on a trunnion or any other suitable means on that side of the pole tensioner opposite to the direction in which the cable is to be pulled. The cable C is wound about the bull wheels 11 and 12 in the manner previously explained and its output end is pulled by winch or tractor up over the cross arms of the next adjacent pole. (See FIG. 1.) The input strand of the cable or wire C is guided by a fair-lead 85 from the reel R to the input groove of the upper bull wheel.

This fair-lead 85 constitutes an important feature of the present invention in that it is self aligning with respect to the incoming cable C and is so constructed as to be equally adapted for use on either side of the tensioning device dependent upon whateevr direction the cable is to be strung. In other words, assuming that the cable C is to be strung in a direction opposite to that shown in FIG. 1. The fair-lead 85 is so disposed as to swing about a pivotal axis 86 so that the cable C may enter the tensioner from the opposite side of the power pole P. In this case the reel R would be placed to the right of the pole P and the strand of cable coming out of the output groove of the upper bull wheel 11 would go off to the left to the next power pole down the line.

The fair-lead 85 is a cluster of four rollers 87—87' and 88—88' each journaled in trunnions 89 and 90 on a lateral extension of a fair-lead arm 91 the opposite end of which is pivotally connected to the frame 15 by a pin 92 secured to the frame at the axis 86 previously mentioned. The four rollers 87—87' and 88—88' are so disposed as to engage the cable at quarter points and provide a passage between them through which the input strand of the cable C is strung before it enters the input groove of the upper bull wheel 11. By this arrangement it matters not whether the reel R is higher or lower with respect to the pole tensioner or whether the wire C is payed off of a full reel or the last convolutes of an empty reel, the fair-lead 85 is self adjusting to the line assumed by the input strand of the wire C and is constantly guided by the cluster of four rollers.

The brake mechanism 13 may be of any well known design in which a pair of brake shoes 93—93' embrace the brake disc 50 so as to deter and retard turning thereof under the influence of the cable paying out over the bull wheels 11 and 12. Such a brake mechanism is disclosed and described in U.S. Patent No. 1,978,974 to Williams dated October 30, 1934. In such arrangement the shoes 93—93' are supported on a brake housing 94 which also supports a set of levers 95 by which the shoes may be forced into frictional engagement with the sides of the brake disc 50. The housing 94 is secured to a bracket 96 extending rearwardly from the back face of the frame 15 so that a handle 97 on the set of levers 95 is disposed above the diagonal side 24 of the frame 15 for manipulation from the front side of the pole tensioner.

From the foregoing it will be appreciated that as the cable C is being pulled by winch or tractor over adjacent poles the several loops of cable around the bull wheels 11 and 12 engage the traction coating in the grooves 51—52 thereof and thereby turn the bull wheels in unison. However, since the brake disc 50 is directly connected to the bull wheels via the train of gears 14, free turning of the bull wheels under the influence of the pull on the cable will be retarded at will by the person attending the pole tensioner. In this manner the cable being strung is kept tense so as not to sag or drag upon the ground and can be secured to the cross arms in tensioned condition while being held under tension.

The entire unit 10 is relatively light in weight in comparison to mobile units heretofore used. The castings for the frame, bull wheels and related parts are preferably made of aluminum which further lightens the burden of placement and movement of the unit 10. To further facilitate ease of handling, the unit is provided with the stand 16 previously mentioned.

The stand 16, consists of a pipe leg 100 guided for sliding movement in a sleeve ring 101 and lower eye 102 formed integrally with the frame 15 on the back face thereof. This guide formed by the sleeve 101 and eye 102 is formed along side the channel base 22 of the frame 15 and adjacent the innermost flange 23' thereof as best seen in FIGS. 2 and 5. The pipe leg 100 is retractable and adapted to be set at three different positions relative to the guide sleeve and eye. To this end the pipe 100 has three holes 103 (a, b and c) formed therethrough on parallel axes and in spaced relation to each other. A bolt 105 slidably mounted across the two flanges 23—23' in alignment with the guide sleeve 101. All three of these members 23, 23' and 101 are provided with aligned bores through which the bolt 105 can extend so as to slide through any one of the holes 103 (a, b or c) in the pipe leg 100 to secure the latter in place relative to the frame 15.

The bolt 105 is normally urged into pipe engaging condition by a compression spring 106 circumscribing the bolt and having one end (left FIG. 5) bearing against flange 23 and its opposite end bearing against a cotter pin 107 extending through the bolt 105. A suitable handle 108 on the free end of the bolt 105 serves to facilitate manipulation of the bolt for the purpose intended.

The pipe leg 100 has a foot pad 109 adapted to rest upon the ground to support the unit 10 in vertical position, when it is tilted up against the power pole P and/or while the clamping means 17 is secured to the pole in the manner already explained.

From the foregoing it will be appreciated that we have provided a novel, light weight, portable wire tensioning unit for use in stringing distribution wire over power poles.

While the foregoing has been described in specific detail it will be appreciated that the same may be susceptible to variations, alterations and/or modifications without departing from the spirit of the invention. We therefore desire to avail ourselves of all modifications, alterations, and/or variations which fairly come within the purview of the appended claims.

What we claim as new and desire to protect by Letters Patent is:

1. In a cable stringing and tensioning apparatus of the type including a pair of coplanar bull wheels operatively associated with a brake disc and brake shoes engageable therewith for retarding turning of said bull wheels under the influence of a cable looped about them; a flat triangular shaped frame having bearings at its adjacent angles for supporting said bull wheels for rotation in a common plane, a bearing at the other angle of said triangular frame having said brake disc journaled thereon, means for drivingly connecting said bull wheels to said brake disc for rotating the latter in unison therewith, and clamping means on that face of said flat frame opposite said bull wheels for securing said frame to a power pole.

2. In a cable stringing and tensioning apparatus of the type including a pair of bull wheels operatively associated with brake means for retarding turning of said bull wheels under the influence of a cable looped about them; a flat plate frame for supporting said bull wheels and brake means in a common plane on one face of said frame, and clamping means on the opposite face of said flat plate frame for securing the same to a power pole, said clamping means comprising a girding chain having its end secured to said frame to circumscribe said pole, and a pole gripping pad on said opposite face of said frame comprising a set of four jaws pivotally connected to the said opposite face of said frame two above and two below the plane of said girding chain and each having a toothed face disposed substantially normal to a radial line extended from vertical center of the pole engaged thereby for securing said frame to said power pole.

3. In a cable stringing and tensioning apparatus of the type including a pair of bull wheels operatively associated with brake means for retarding turning of said bull wheels under the influence of a cable looped about them; a flat plate frame for supporting said bull wheels and brake means in a common plane on one face thereof, and clamping means on the opposite face of said flat plate frame for securing the same to a power pole, said clamping means comprising a girding chain having its ends secured to said frame to circumscribe said pole, a pole gripping pad on said opposite face of said frame comprising a set of four jaws pivotally connected to the said opposite face of said frame two above and two below the plane of said girding chain and each having a toothed face disposed substantially normal to a radial line extended from vertical center of the pole engaged thereby for securing said frame to said power pole, and screw means interposed in said chain for tightening the latter about said pole.

4. A pole mount for a cable stringing and tensioning apparatus of the type including a pair of bull wheels journaled for rotation in a common plane and operatively associated with brake means for retarding turning of said bull wheels under the influence of a cable looped about them; comprising a flat frame for supporting said bull wheels and brake means in parallel relation thereto and in a common plane on one face thereof, and clamping means on the opposite face of said flat frame for securing said frame to said power pole, said clamping means comprising a girding chain having its ends secured to said frame to circumscribe said pole, and a pole gripping pad on said opposite face of said frame in the girding chain zone thereof for gripping said pole comprising a set of four jaws pivotally connected to the said opposite face of said frame two above and two below the plane of said girding chain and each having a toothed face disposed substantially normal to a radial line extended from vertical center of the pole engaged thereby for securing said frame to said power pole.

5. In a cable stringing and tensioning apparatus of the type including a pair of coplanar bull wheels operatively associated with a brake disc and brake shoes engageable therewith for retarding turning of said bull wheels under the influence of a cable looped about them; a flat triangular shaped frame having bearings at its adjacent angles for supporting said bull wheels for rotation in a common plane, a bearing at the other angle of said triangular frame having said brake disc journaled thereon, means for drivingly connecting said bull wheels to said brake disc for rotating the latter in unison therewith, a fair lead pivotally mounted at the upper end of said frame vertically above said bull wheels for rocking movement in the plane thereof to either side for guiding cable thereto from either direction and clamping means on that face of said flat frame opposite said bull wheels for securing said frame to a power pole, said clamping means comprising a girding chain having its ends secured to said frame to circumscribe said pole, and a pole gripping pad on the face of said frame opposite said bull wheels in the girding chain zone thereof for gripping said pole.

6. In a cable stringing and tensioning apparatus of the type including a pair of coplanar bull wheels operatively associated with a brake disc and brake shoes engageable therewith for retarding turning of said bull wheels under the influence of a cable looped about them; a flat triangular shaped frame having bearings at its adjacent angles for supporting said bull wheels for rotation in a common plane, a bearing at the other angle of said triangular frame having said brake disc journaled thereon, means for drivingly connecting said bull wheels to said brake disc for rotating the latter in unison therewith, and clamping means on that face of said flat frame opposite said bull wheels for securing said frame to a power pole, said clamping means comprising a girding chain having its ends secured to said frame to circumscribe said pole, a pole gripping pad on the face of said frame opposite said bull wheels in the girding chain zone thereof for gripping said pole, and screw means interposed in said chain for tightening the latter about said pole.

7. The combination with a cable stringing and tensioning apparatus of the type including a pair of bull wheels adapted to be journaled for rotation in a common plane and operatively associated with brake means for retarding turning of said bull wheels under the influence of a cable looped about them; of means for supporting said bull wheels and brake means for anchorage to a power pole comprising a flat plate frame of isosceles triangular shape having an integral channel formed along its base and a pair of stud shafts extending forwardly therefrom at its base angles, a bearing hub on each said bull wheel journaled on a respective one of said stud shafts for supporting said bull wheels for rotation in a common plane, said brake means including a brake disc and a pair of lever operated brake shoes disposed to embrace said disc, a stud shaft on said brake disc, a bearing for the stud shaft of said brake disc at the altitudinal angle of said triangular shaped frame, a bracket on one side of said frame for supporting said lever operated brake shoes in operative position relative to said brake disc, a recess formed on one face of said frame inside the plane in which said bull wheels are disposed, a train of gears in said recess including a bull wheel gear secured to each of said bull wheels, a pinion gear on the stud shaft of said brake disc, and an idler gear joprnaled for rotation on said frame along the altitudinal axis of said isosceles triangular frame and in mesh with each of said bull wheel gear and pinion gear, and clamping means on the opposite face of said frame for securing the latter to a power pole with the base side of said isosceles triangular shape of said frame disposed parallel to said pole.

8. The combination with a cable stringing and tensioning apparatus of the type including a pair of bull wheels adapted to be journaled for rotation in a common plane and operatively associated with brake means for retarding turning of said bull wheels under the influence of a cable looped about them; of means for supporting said bull wheels and brake means for anchorage to a power pole comprising a flat plate frame of isosceles triangular shape having an integral channel formed along its base and a pair of stud shafts extending forwardly therefrom at its base angles, a bearing hub on each said bull wheel journaled on a respective one of said stud shafts for supporting said bull wheels for rotation in a common plane, said brake means including a brake disc and a pair of lever operated brake shoes disposed to embrace said disc, a stud shaft on said brake disc, a bearing for the stud shaft of said brake disc at the altitudinal angle of said triangular shaped frame, a bracket on one side of said frame for supporting said lever operated brake shoes in operative position relative to said brake disc, a recess formed on one face of said frame inside the plane in which said bull wheels are disposed, a train of gears in said recess including a bull wheel gear secured to each of said bull wheels, a pinion gear on the stud shaft of said brake disc, and an idler gear journaled for rotation on said frame along the altitudinal axis of said isosceles triangular frame and in mesh with each of said bull wheel gear and pinion gear, and clamping means on the opposite face of said frame for securing the latter to a power pole with the base side of said isosceles triangular shape of said frame disposed parallel to said pole, said clamping means comprising a girding chain having its ends secured to said frame to circumscribe said pole, and a pole gripping pad on the said opposite face of said frame in the girding chain zone thereof for gripping said pole.

9. The combination with a cable stringing and tensioning apparatus of the type including a pair of bull wheels adapted to be journaled for rotation in a common plane and operatively associated with brake means for retarding turning of said bull wheels under the influence of a cable looped about them; of means for supporting said bull wheels and brake means for anchorage to a power pole comprising a flat plate frame of isosceles triangular shape having an integral channel formed along its base and a pair of stud shafts extending forwardly therefrom at its base angles, a bearing hub on each said bull wheel journaled on a respective one of said stud shafts for supporting said bull wheels for rotation in a common plane, said brake means including a brake disc and a pair of lever operated brake shoes disposed to embrace said disc, a stud shaft on said brake disc, a bearing for the stud shaft of said brake disc at the altitudinal angle of said triangular shaped frame, a bracket on one side of said frame for supporting said lever operated brake shoes in operative position relative to said brake disc, a recess formed on one face of said frame inside the plane in which said bull wheels are disposed, a train of gears in said recess including a bull wheel gear secured to each of said bull wheels, a pinion gear on the stud shaft of said brake disc, and an idler gear journaled for rotation on said frame along the altitudinal axis of said isosceles triangular frame and in mesh with each of said bull wheel gear and pinion gear, and clamping means on the opposite face of said frame for securing the latter to a power pole with the base side of said isosceles triangular shape of said frame disposed parallel to said pole, said clamping means comprising a girding chain having its ends secured to said frame to circumscribe said pole, a pole gripping pad on the said opposite face of said frame in the girding chain zone thereof for gripping said pole, and screw means interposed in said chain for tightening the latter about said pole.

10. The combination with a cable stringing and tensioning apparatus of the type including a pair of bull wheels journaled for rotation in a common plane and operatively associated with brake means for retarding turning of said bull wheels under the influence of a cable looped about them; of means for supporting said bull wheels and brake means for anchorage to a power pole comprising a frame having on one face thereof a vertical channel and a horizontal channel extending laterally in a common plane therefrom, a pair of stud shafts extending through said frame and beyond the opposite face thereof from said vertical channel and equidistantly one above and one below said horizontal channel, a bearing hub on each said bull wheel journaled on a respective one of said stud shafts adjacent said opposite face of said frame, said brake means including a brake disc and a pair of lever operated shoes disposed to embrace said disc, a stud shaft on said brake disc, a bearing housing on said horizontal channel in spaced relation to said vertical channel for supporting the stud shaft of said brake disc, a bracket on said one face of said frame between said horizontal and vertical channels for supporting said lever operated shoes in operating position relative to said brake disc, means for drivingly connecting said bull wheels to said brake disc for rotating the latter in unison therewith, and clamping means on said one face of said frame for securing the vertical channel thereof in parallel relation to a power pole.

11. The combination with a cable stringing and tensioning apparatus of the type including a pair of bull wheels journaled for rotation in a common plane and operatively associated with brake means for retarding turning of said bull wheels under the influence of a cable looped about them; of means for supporting said bull wheels and brake means for anchorage to a power pole comprising a frame having on one face thereof a vertical channel and a horizontal channel extending therefrom, a pair of stud shafts extending through said frame and beyond the opposite face thereof from said vertical channel and equidistantly one above and one below said horizontal channel, a bearing hub on each said bull wheel journaled on a respective one of said stud shafts adjacent said opposite face of said frame, said brake means including a brake disc and a pair of lever operated shoes disposed to embrace said disc, a stud shaft on said brake disc, a bearing housing at the free end of said horizontal channel for supporting the stud shaft of said brake disc, a bracket on said one face of said frame between said horizontal and vertical channels for supporting said lever operated shoes in operating position relative to said brake disc, a train of gears for drivingly connecting said bull wheels to said brake disc for rotating the latter in unison therewith including a bull wheel gear secured to each of said bull wheels, a pinion gear on the stud shaft of said brake disc, and an idler gear journaled for rotation on said frame and in mesh with each of said bull wheel gear and said pinion gear, and clamping means on said one face of said frame for securing the vertical channel thereof in parallel relative to a power pole.

12. The combination with a cable stringing and tensioning apparatus of the type including a pair of bull wheels journaled for rotation in a common plane and operatively associated with brake means for retarding turning of said bull wheels under the influence of a cable looped about them; of means for supporting said cable stringing and tensioning apparatus to a power pole comprising a frame for supporting said bull wheels and brake means in a common plane, clamping means on one face of said frame comprising a pole girding means having its ends secured to said frame, screw means interposed between the ends of said pole girding means for drawing the latter tightly about said power pole, and a pole engaging pad comprising a set of four jaws pivotally connected to the said one back face of said frame, two above and two below the plane of said girding means, each said jaw having a toothed face disposed substantially normal to a radial line extended from vertical center of the pole engaged thereby for firmly stabilizing said frame relative to said power pole when said pole girding means is drawn tightly about the latter.

13. The combination with a cable stringing and tensioning apparatus of the type including a pair of bull wheels journaled for rotation in a common plane and operatively associated with brake means for retarding turning of said bull wheels under the influence of a cable looped about them; of means for supporting said bull wheels and brake means for anchorage to a power pole comprising a frame having on one face thereof a vertical channel and a horizontal channel extending therefrom, a pair of stud shafts extending through said frame and beyond the opposite face thereof from said vertical channel and equidistantly one above and one below said horizontal channel, a bearing hub on each said bull wheel journaled on a respective one of said stud shafts adjacent said opposite face of said frame, said brake means including a brake disc and a pair of lever operated shoes disposed to embrace said disc, a stud shaft on said brake disc, a bearing housing at the free end of said horizontal channel for supporting the stud shaft of said brake disc, a bracket on said one face of said frame between said horizontal and vertical channels for supporting said lever operated shoes in operating position relative to said brake disc, means for drivingly connecting said bull wheels to said brake disc for rotating the latter in unison therewith, clamping means on said one face of said frame for securing the vertical channel thereof in parallel relation to a power pole and a leg adjustably mounted on the lower end of said vertical channel having an earth engaging foot pad at its lower end for supporting said frame adjacent said power pole and facilitating tilt up action of said frame toward the same.

References Cited in the file of this patent

UNITED STATES PATENTS

| | | |
|---|---|---|
| 880,552 | Lundin | Mar. 3, 1908 |
| 1,543,122 | Ravenscroft | June 23, 1925 |
| 1,978,974 | Williams | Oct. 30, 1934 |

FOREIGN PATENTS

| | | |
|---|---|---|
| 474,250 | Italy | Sept. 13, 1952 |